United States Patent [19]
Glass et al.

[11] Patent Number: 5,004,325
[45] Date of Patent: Apr. 2, 1991

[54] OPTICAL PROCESSING USING A MULTILAYER HETEROSTRUCTURE

[75] Inventors: Alastair M. Glass; Wayne H. Knox, both of Rumson, N.J.; David D. Nolte, West Lafayette, Ind.

[73] Assignee: AT&T Bell Laboratories, Murray Hill, N.J.

[21] Appl. No.: 465,274

[22] Filed: Jan. 16, 1990

[51] Int. Cl.$^5$ .............................................. G02F 1/01
[52] U.S. Cl. .............................. 350/354; 250/370.08; 350/96.12
[58] Field of Search ................ 250/370.01, 370.08, 250/336.1, 327.2; 350/353, 354, 355, 356, 96.11, 96.12, 96.34; 357/16, 17, 30; 330/4, 4.3

[56] References Cited

U.S. PATENT DOCUMENTS

| | | | |
|---|---|---|---|
| 4,525,687 | 6/1985 | Chemla et al. | 330/4.3 |
| 4,528,464 | 7/1985 | Chemla et al. | 307/425 |
| 4,848,880 | 7/1989 | Aull et al. | 350/355 |
| 4,872,744 | 10/1989 | Abeles et al. | 350/356 |
| 4,873,439 | 10/1989 | Hagelstein et al. | 250/327.2 |
| 4,923,264 | 5/1990 | Langer et al. | 350/96.14 |

OTHER PUBLICATIONS

Gunter, P. et al., The Photorefractive Effect, Springer Verlag, 1987.
Glass, A. M., "Materials for Optical Information Processing," *Science,* vol. 226, 1984, pp. 657-662.
Glass, A. M., "Materials for Photonic Switching and Information Processing", *MRS Bulletin,* vol. 13, No. 8, 1988, pp. 16-20.
Miller, D. A. B. et al., "Electric Field Dependence of Optical Absorption Near the Bandgap of Quantum Well Structures," *Phys. Rev.,* vol. B32, 1985, pp. 1043-1060.
Dohler, G. H., "Semiconductor Superlattices-A New Material for Research and Applications," *Physica Scripta.,* vol. 24, 1982, pp. 430-439.

*Primary Examiner*—Frank Gonzalez
*Assistant Examiner*—Galen J. Hansen
*Attorney, Agent, or Firm*—M. I. Finston

[57] ABSTRACT

An electro-optic medium, useful for image processing, is formed by creating a distribution of deep impurity levels over essentially all the lateral extent of a multilayer heterostructure. This treatment renders the heterostructure semi-insulating, and as a consequence, individual image-resolution elements are isolated. Described is an optical system comprising such an electro-optic medium.

11 Claims, 2 Drawing Sheets

OPTICAL PROCESSING USING A MULTILAYER HETEROSTRUCTURE

TECHNICAL FIELD

The invention relates to the use of non-linear optical materials for processing signals entirely in the optical domain, and more particularly, to the use of semi-insulating multiple quantum well structures exhibiting large electro-optical effects.

BACKGROUND OF THE INVENTION

The photorefractive effect, based on charge transport in electro-optic materials, is an optical nonlinearity that is useful for optical image processing. When a non-uniform pattern of illumination at an appropriate wavelength impinges on a photorefractive medium, the illumination pattern is temporarily stored in the medium as a pattern of refractive index variations. In typical applications, the pattern, which may, for example, be a diffraction grating or a hologram, is capable of diffracting a beam of light, here called the operand beam, that is propagated through it. As a result of diffraction by the medium, the operand beam upon exiting the medium is in a different state than when it entered. If the stored pattern is for the purpose of, e.g., modulation, the change of state represents the imposition of a signal onto the operand beam. Alternatively, two or more beams simultaneously present in the medium may interact in a more complex way such as to produce, e.g., the cross correlation of two spatially varying intensity patterns, or a holographic interferogram. (See P. Gunter and J. P. Huignard, *The Photorefractive Effect*, Springer Verlag, 1987, for reviews of applications.)

The photorefractive effect is based on the photoexcitation of free electric charge carriers (electrons or holes or both) in electro-optic crystals. The carriers then migrate away from the illuminated regions to trappidg sites, either by diffusion or by drift in an externally applied electric field. The resulting redistribution of charge creates space-charge fields within the crystal, which in turn create refractive index variations via the electro-optic effect. The refractive index change per absorbed photon in electro-optic materials is proportional to $n_i^3 r_{ij}/\epsilon_j$, where $n_i$ is the refractive index, $r_{ij}$ is the linear electro-optic coefficient, and $\epsilon_j$ is the dielectric constant. Some typical materials exhibiting relatively large values of this figure of merit are $BaTiO_3$, $Bi_{12}SiO_{20}$, $Sr_{1-x}Ba_xNb_2O_5$, InP, GaAs, and CdTe. In all of these materials, when optimized with the appropriate absorbing centers and trapping centers, the energy required per bit for photorefractive image processing is of the order of 1 pJ for a one square micrometer bit. The relaxation time depends only on the dielectric relaxation time of the material, and is therefore generally longer for insulators than for semiconductors. Over the range of materials of interest, the relaxation time varies typically from nanoseconds to seconds, although materials may exhibit both faster or slower relaxation times. When the relaxation is relatively slow, laser intensities less than 1 $mW/cm^2$ are often sufficient to perform real-time image processing at diffraction-limited spatial resolution. The theory and applications of optical materials are discussed, for example, in A. M. Glass, "Materials for Optical Information Processing," *Science*, Vol. 226 (1984) pp. 657–662.

Another non-linear optical effect, analogous to the linear electro-optic effect, is the resonant electroabsorption that occurs near the band edge of layered semiconductor materials in the form of multiple quantum wells (MQWs), such as GaAs-AlGaAs multilayer heterostructures. The quantum well bound states of these structures give rise to a sharp room-temperature excitonic absorption peak in the heterostructure absorption spectrum near the band edge. The shape of the exciton peak, and therefore the optical absorptive and refractive effects associated with it, is sensitive to internal electric fields within the material. (The sensitivity of the optical absorption coefficient to electric fields is called "electroabsorption.") When an electric field is applied perpendicular to the quantum well layers, this effect is called the quantum confined Stark effect (QCSE), and when the electric field is applied parallel to the layers, the broadening is due to field-ionization. Internal electric fields, arising in response to applied external electric fields, change the electron and hole energy levels of the quantum wells. As a consequence, the exciton peak is broadened and/or shifted to lower energy. Because this effect is a resonant effect (that is, the incident light is at a wavelength close to the exciton absorption), it is generally much more sensitive to electric fields than the non-resonant linear electro-optic effect typically used in bulk photorefractive crystals.

One device that makes use of the electroabsorption is the self-electro-optic-effect device (SEED). In a SEED, the heterostructure is biased through a series resistor. Photocurrent resulting from optical absorption in the quantum wells causes a voltage drop across the resistor, reducing the applied field in the heterostructure and, as a consequence, changing its optical absorption. SEEDs are advantageous for optical switching because only very thin layers, typically of about one micrometer thickness, are needed. By contrast, photorefractive bulk crystals require an optical interaction length of about one centimeter. Moreover, as a consequence of the high sensitivity of the electroabsorption, SEEDs require very small amounts of optical energy. For example, an on-off contrast ratio of 2:1 in transmission can be achieved using only about 4 fJ per square micrometer of optical energy. However, SEEDs suffer from the disadvantage that because the heterostructure conducts electricity in the directions parallel to the layers, parallel multichannel processing, e.g., image processing, is possible only if individual pixels are reticulated and provided with individual electrical contacts. For example, the individual pixels are typically isolated by etching mesas using photolithographic techniques. This limits the spatial resolution obtainable to the resolution of the lithographic processing required to provide reticulation and individual contacts. In particular, it is unlikely that diffraction-limited resolution can be achieved using this technology. The theory and applications of electroabsorption are discussed, for example, in A. M. Glass, "Materials for Photonic Switching and Information Processing," *MRS Bulletin*, Vol. 13, No. 8 (1988) pp. 16–20 and D. A. B. Miller et al, "Electric Field Dependence of Optical Absorption Near the Bandgap of Quantum Well Structures," *Phys. Rev.*, Vol. B32 (1985) pp. 1043–1060.

Thus, in many applications, it is advantageous to use the large resonant electro-optic effects near the exciton states of quantum well structures because very short optical interaction lengths, typically about one micrometer, are required, and because very small optical energy, typically several pJ per square micron, is required.

(In practice, because of the large pixel size typically obtained by conventional lithography, the energy required is a few pJ per pixel.) However, practitioners in the art have thus far been unable to provide an electro-optic heterostructure that is capable of parallel, multichannel, image processing at diffraction-limited resolution.

SUMMARY OF THE INVENTION

A multilayer heterostructure can be made semi-insulating by creating within it a sufficiently dense volume distribution of deep impurity levels. It has been discovered that as a consequence of such treatment, individual image-resolution elements are isolated simply by virtue of the semi-insulating property of the treated heterostructure. This treatment thus provides an electro-optic medium, useful for image processing, that combines the resolution of photorefractive devices with the sensitivity and short interaction length of quantum well devices. This makes it possible to have diffraction-limited image resolution while minimizing optical energy requirements. As in the conventional photorefractive effect, photocarriers are redistributed among deep levels (in this case, within or close to the quantum well structure), causing internal space-charge fields to arise. However, in the present invention, the variations of the refractive index and optical absorption coefficient are provided via the effects of the internal fields on quantum-confined excitons.

Thus, in one embodiment, the invention involves an apparatus for optical signal processing, including a multilayer heterostructure having a distribution of deep levels capable of localizing photocarriers. The deep levels are distributed over essentially all the lateral extent of the heterostructure. Means are also included for applying an external electric field to the heterostructure. While the external field is applied, the heterostructure is exposed to a spatially non-uniform pattern of illumination involving one or more light beams in order to create within the heterostructure a spatially non-uniform pattern of charge polarization. Either during exposure or otherwise before the charge polarization is dissipated, an operand beam of light is propagated through the heterostructure. The operand beam may also be one of the light beams involved in the creation of the pattern of charge.

DETAILED DESCRIPTION

Figure 1:
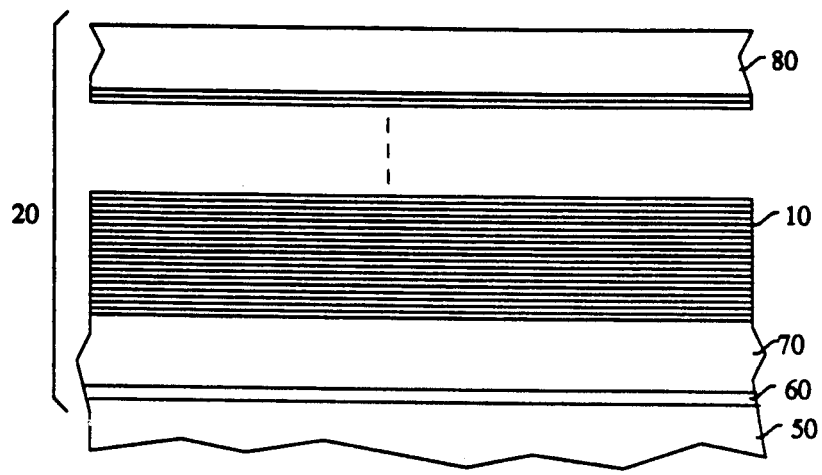
FIG. 1 is a schematic cross-sectional view of a multilayer heterostructure formed on the surface of a substrate, according to one embodiment of the invention.

Multilayer heterostructures are well-known in the art and are described, for example, in G. H. Döhler, "Semiconductor Superlattices—A New Material for Research and Applications," *Physica Scripta*, Vol. 24 (1981) pp. 430–439. Briefly, a multilayer heterostructure comprises a sequence of epitaxial semiconductor layers, such that the materials of adjacent layers have different values of the band gap. The layers are typically very thin, typically of about 100 Å thickness. Because of the band-gap difference, carriers tend to be confined in those layers having the smaller band-gap. Confined carriers can move within the layer, but cannot readily move in the direction normal to the planes of the layers. Thus, the smaller-band-gap, or confining, layers behave as quantum wells. Carriers confined in the quantum wells have energy eigenstates substantially determined by the thickness of the confining layer, the height of the energy barrier created by the band-gap difference, and the effective mass of the confined carrier. Correlated electron-hole pairs, called excitons, are generated by the absorption of light at the exciton peak wavelength, and are confined within the quantum wells. (For present purposes, by "light" is meant any electromagnetic radiation in the infrared, visible, or ultraviolet ranges of the spectrum.) If the quantum well supports more than one eigenstate, optical transitions can also occur to higher-energy confined states. More typically, the transition is to an ionized state in which the electron, or the hole, or both carriers, are quasi-free and can move through the structure in three dimensions. (The carriers that become quasi-free as a result of optical absorption are here called photocarriers.) For purposes of the invention, the quantum well should support at least one confined exciton, such that the optical spectrum contains at least one well defined excitonic absorption peak. Moreover, as a general rule, the sharper the excitonic absorption peak, the more sensitive it is to the applied electric field.

It should be noted in this regard that although excitonic absorption is preferred because of its high sensitivity to electric fields, other kinds of optical excitations also exhibit electroabsorption. Thus, multilayer structures not showing exciton absorption may be used at optical wavelengths near the absorption edge. For example, electron and hole eigenstates need not be confined in the same semiconductor layer, but may be in adjacent, or otherwise nearby, layers.

Certain impurity atoms or structural defects are capable of binding photocarriers. When the bound-state energy is relatively close to the center of the band gap (i.e., at least 0.1 eV from the conduction band edge or the valence band edge), such a bound state is referred to as a deep level. For purposes of the invention, the preferred method for creating deep levels is by proton implantation, although other methods are also useful. For example, deep levels are readily created by implanting oxygen ions, or by exposing the heterostructure to neutrons, or by doping the heterostructure with certain impurities. For example, in GaAs, the dopant chromium, and in InP, the dopant iron are useful for creating deep levels. However, proton implantation is preferable because it is known to preserve the sharp excitonic absorption peak of the heterostructure, and is a relatively simple procedure for introducing deep levels subsequent to the preparation of the multilayer structure.

For purposes of the invention, it is desirable to have a deep level volume concentration within the range $10^{16}$ cm$^{-3}$ to $10^{19}$ cm$^{-3}$ but preferably of about $10^{16}$ cm$^{-3}$ to $10^{17}$ cm$^{-3}$. At this concentration, essentially all mobile carriers are frozen out, provided the layers have not been deliberately doped to create a high density of carriers before implantation. Typical carrier densities in as-grown, undoped GaAs layers grown by MBE or MOCVD lie in the range of $10^{14}$ to $10^{15}$ cm$^{-3}$, in which case essentially all carriers are frozen out by trapping on deep levels at a deep level concentration of $10^{16}$ cm$^{-3}$ at room temperature.

The resistivity of the heterostructure is dependent on the deep level concentration as well as on the density of shallow levels (i.e., donors and acceptors). The resistivity, in turn, partly determines the relaxation time of the heterostructure. That is, the charge polarization trapped on the defects is eventually dissipated by recombination of the photocarriers, and thus the relaxation time of the heterostructure is equivalent to the characteristic polarization lifetime during which a fraction 1/e of the photocarriers recombine, i.e., return to their unpolarized positions. If the relaxation time is too short, very intense illumination is required to create the desired pattern of refractive index variations, and only a short period of time is thereafter available for processing the operand beam. By contrast, if the relaxation time is too long, then the material responds too slowly to changes of the incident light beams. While such slow response may be useful for certain memory applications, for most applications a relaxation time of 1 $\mu$s–10 ms is desirable. The relaxation time is proportional to the product of the resistivity of the heterostructure in the direction of the charge transport (electron and hole displacement) and its dielectric constant in the same direction. Thus, for example, in a heterostructure of GaAs-AlGaAs having a dielectric constant $\epsilon$ of about 10 $\epsilon_0$, the relaxation time can be adjusted to about 1 ms by adjusting the resistivity to about $10^9$ $\Omega$-cm resulting from a concentration of deep levels of about $10^{16}$ cm$^{-3}$.

Two device geometries are considered, one in which the applied electric field is parallel to the layers of the heterostructure, and one in which the applied field is perpendicular to the layers. (The second, "perpendicular" geometry is similar to that employed in SEEDs.) Although both geometries are useful, it is to be noted that the perpendicular geometry has certain advantages for large-scale image processing. Because the external electric field is applied across the relatively small thickness of the heterostructure, relatively small applied voltages are required. Moreover, the speed of the perpendicular-geometry device is improved by limiting the distance the photocarriers can drift in the applied field, relative to the distance they drift in the parallel geometry. That is, in the perpendicular geometry, at least one of the field electrodes must be separated from the heterostructure by an insulating buffer layer in order to avoid shunting photoelectrons from one portion of the image area to another. Photocarriers generated in the heterostructure move perpendicular to the layers, and are ultimately trapped at the interface between the heterostructure and the buffer layer. As a consequence, no photocarriers can drift through a distance greater than the thickness of the heterostructure. By contrast, photocarriers drifting within and parallel to, e.g., a GaAs layer, typically drift 10 microns per kilovolt of applied potential between the electrodes.

A further advantage of the perpendicular geometry is the possibility of electrical switching. That is, the polarization pattern can be very quickly discharged by suddenly transforming the buffer layer from an insulator to a conductor. This can be done, for example, by making the buffer layer from semiconductor materials and using junction field effects or photoconductivity to switch the conductivity of the buffer layer.

A particular embodiment of the invention is described below. With reference to FIG. 1, the multiple quantum well (MQW) portion 10 of the multilayer heterostructure 20 consists of, for example, sixty layers of GaAs in alternation with sixty layers of Al$_{0.3}$Ga$_{0.7}$As. The GaAs layers 30 are 75 Å in thickness, and the Al$_{0.3}$Ga$_{0.7}$As layers 40 are 100 Å in thickness, resulting in a total MQW thickness of 1.05 $\mu$m. Heterostructure 20 is grown on GaAs substrate 50 by molecular beam epitaxy (MBE). First, GaAs layer 60 is grown to a thickness of 0.2 $\mu$m. Then, Al$_{0.3}$Ga$_{0.7}$As layer 70 is grown to a thickness of 1.3 $\mu$m. (Layer 70 is the etch-stopping layer and is used to protect the heterostructure from the etchant when the substrate is subsequently removed by etching.)

After layer 70 is grown, MQW portion 10 is grown, starting with a layer of Al$_{0.3}$Ga$_{0.7}$As. After the last MQW layer of GaAs is grown, layer 80 of Al$_{0.3}$Ga$_{0.7}$As is grown to a thickness of 0.5 $\mu$m. Substrate 50 is then removed by etching to layer 70, as discussed above.

It is advantageous to use Al$_x$Ga$_{1-x}$As and GaAs as the materials of the heterostructure, because the technology for preparing quantum wells is now readily available. In addition, the optical and electrical properties of GaAs are well suited to applications at 0.83 microns where lasers are readily available. However, other materials are also readily used, for example, InP, In$_x$Ga$_{1-x}$As$_y$P$_{1-y}$ heterostructures as well as other combinations of III-V and II-VI semiconductor systems.

In designing a heterostructure, the choice of materials for the alternating layers 30 and 40 is constrained in several ways. The materials must be nearly lattice matched (such nearly lattice matched layers include strained-layer superlattices), there must be a discontinuity in the conduction band, or the valence band, or both, at each interface between the materials, and the discontinuity must be such as to give rise, in at least one of the materials, to at least one confined eigenstate in the conduction band or the valence band. The heterostructure may be either Type I (both the conduction and valence band edges of the second material lie within the band gap of the first material) or Type II (both the conduction and valence band edges of the second material lie lower in energy than the corresponding edges of the first material).

The overall thickness of portion 10 of the structure should be less than about 100 $\mu$m, but in order to provide adequate optical absorption for efficient image recording, portion 10 should contain at least 4 layers and preferably contains at least five pairs of layers 30 and 40, each layer having a thickness of at least about 30 Å but not more than about 300 Å. Preferably, portion 10 should be no more than about 10 $\mu$m in thickness, because substantially thicker structures are difficult to fabricate by MBE or MOCVD, the preferred fabrication techniques. Ultimately, the thickness of portion 10 is limited by optical absorption. That is, the wavelength of the operand beam of light is equal to, or close to, the excitation wavelength that causes the electro-optic effect. Consequently, if the heterostructure is too thick, it will absorb most of the light in the operand beam, and will therefore not be useful for optical information processing. For example, the absorption length at a typical exciton absorption peak is about 1 $\mu$m. If the wavelength used falls in the tail portion of the absorption peak, the extinction will be much less, and in that case thicknesses up to about 100 $\mu$m can be tolerated. Indeed, since the sensitivity of the electro-optic effect is smaller in that region, then thicker layers would be desirable. The total effect on the operand beam is the product of the electro-optic effect and the thickness of electro-optic material traversed by the beam.

After the substrate is removed, a uniform distribution of deep levels is created by, e.g., implanting the heterostructure with a dose of $10^{12}$ protons per square centimeter at an implantation energy of 200 keV. This dose creates a volume density of deep levels of about $10^{16}$ cm$^{-3}$ or somewhat greater, which raises the average resistivity of typical undoped material to $10^9$ ohm-cm. As discussed above, the relaxation time can be adjusted by varying the dose to change the resistivity (or by varying the doping concentration of the layers). Also as discussed above, the deep levels can also be created by, e.g., oxygen implantation, doping, or neutron damage.

Figure 2:
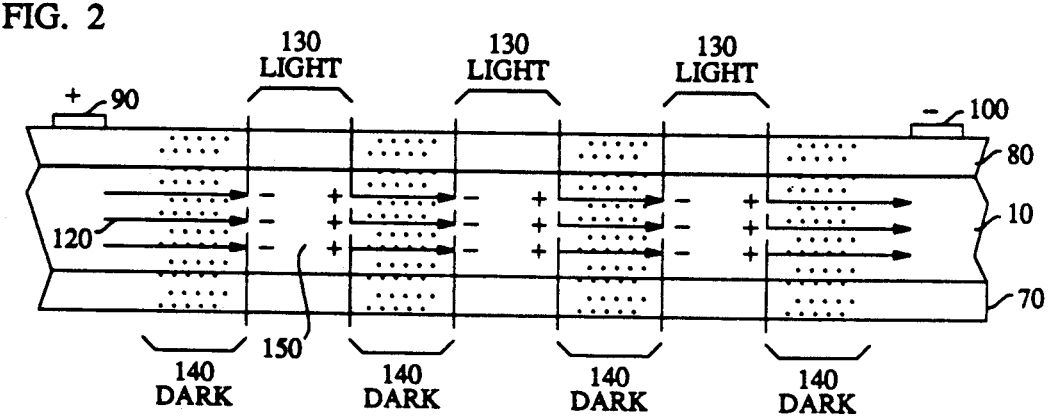
FIG. 2 is a schematic cross-sectional view of the heterostructure of FIG. 1, further having electrodes formed on it to form a parallel-geometry device.

Next, at least two electrodes (90 and 100 in FIG. 2 or, alternatively 90' and 100' in FIG. 3) for applying the external field are formed. A typical electrode material for use in the parallel geometry is chrome-gold, deposited by evaporation of the metals in vacuum, as is well-known in the art. If the device is to have parallel geometry, as depicted in FIG. 2, then electrodes 90 and 100 are deposited directly on one face of the heterostructure, for example, directly on the surface of layer 80. One such electrode is deposited in the form of a strip at each end of the heterostructure.

Figure 3:
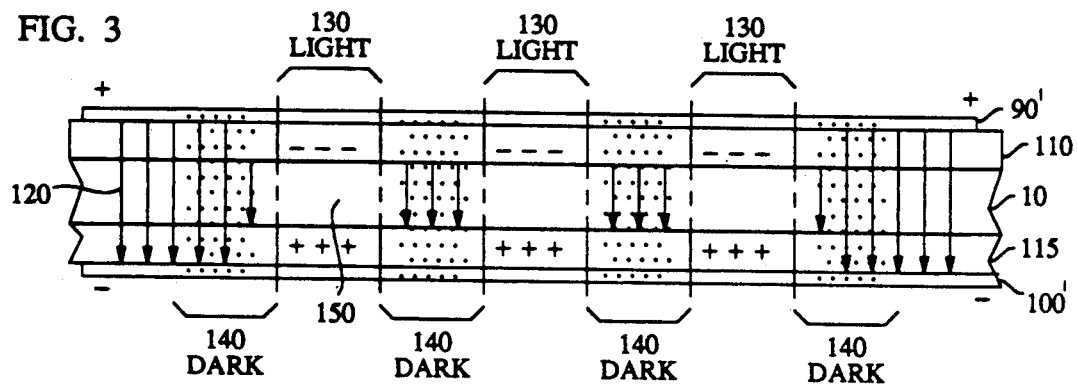
FIG. 3 is a schematic cross-sectional view of the heterostructure of FIG. 1, further having electrodes formed on it to form a perpendicular-geometry device.

By contrast, if the device is to have perpendicular geometry, as illustrated in FIG. 3, each of electrodes 90' and 100' overlies an entire face of the heterostructure and is therefore deposited in the form of a sheet. Electrodes 90' and 100' must be partially transparent at the wavelength of the illumination pattern to be recorded and at the wavelength of the operand beam. A typical electrode material that is partially transparent in the wavelength range 0.8 μm is a layer of gold less than 100 Å thick, deposited by electron beam evaporation. However, a preferred electrode is a doped semiconductor layer having a resistance less than about 1 kΩ per square. The layer may be prepared by MBE, or alternatively by any other deposition technique (since epitaxial growth is not required). Contact is made to the semiconductor with a metal layer (i.e., gold) at the periphery of the illuminated region. Moreover, in the case of the perpendicular geometry, at least one of the electrodes must be separated from the heterostructure by an intervening insulating buffer layer 110 or 115 in order to avoid shunting photocarriers from one image portion to another, as discussed above. The buffer layer can be of any material of sufficiently high resistivity, provided only that it is substantially transparent to the operating wavelength or wavelength range of the device and that it is practicable to deposit it on the heterostructure. The resistivity is sufficiently high if it is greater than twice the resistivity of the semi-insulating MQW layers (during illumination). One practical material for forming buffer layers is silicon dioxide, which is readily deposited directly on layer 70 or layer 80 of FIG. 1 by any of several techniques well known for silicon IC manufacture, such as electron beam deposition or plasma assisted deposition.

To create a polarization pattern in the heterostructure, an applied electric field is first created by applying a potential difference to the electrodes. In the parallel geometry, typically, a field of about 4 kV/cm is applied. In the perpendicular geometry fields as large as 100 kV/cm may be applied. (As noted, above, the relaxation time of devices in the perpendicular geometry is relatively free of the effects of drift length in high applied fields. In addition, because the buffer layer does not conduct electricity, joule heating of the device is avoided.) Exemplary field lines 120 are depicted in FIG. 2 and FIG. 3. The device is then exposed to a non-uniform pattern of illumination at an appropriate wavelength. Appropriate wavelengths are those lying near the excitonic absorption peak near the band edge of the heterostructure. For example, FIG. 2 and FIG. 3 depict light interference fringes 130 and dark interference fringes 140 falling on the heterostructure, and the resulting polarized regions 150.

Figure 4:
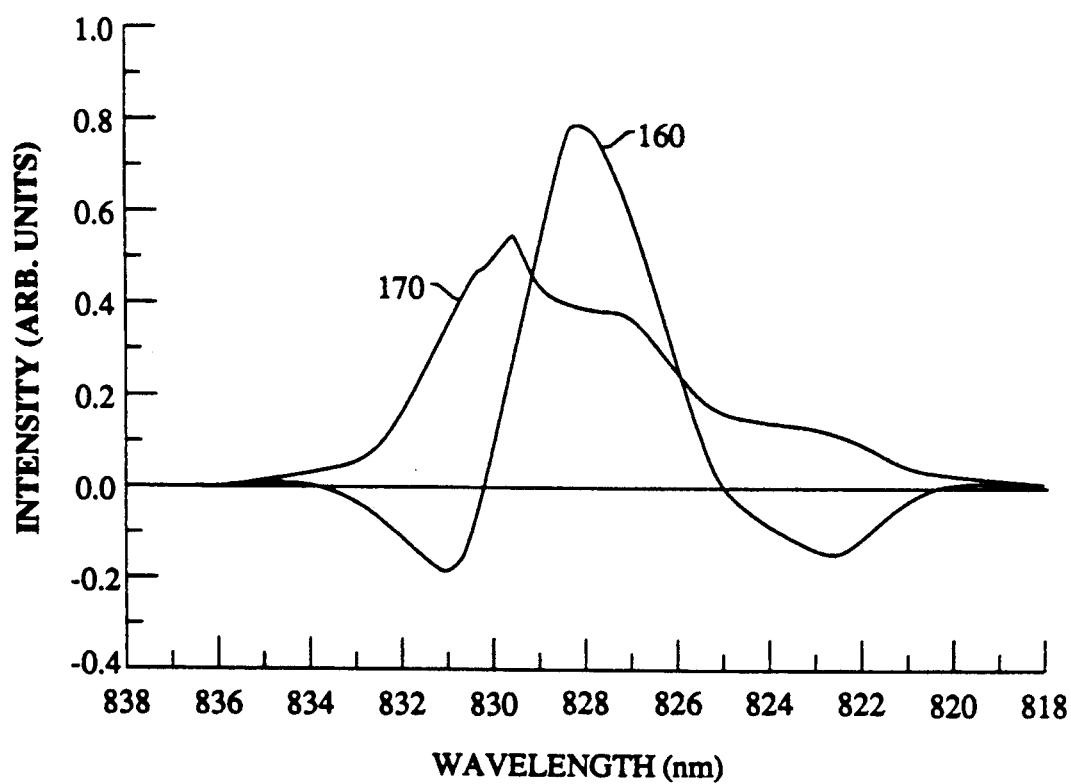
FIG. 4 shows a diffraction spectrum and an electroabsorption spectrum of the device of FIG. 2.

FIG. 4 depicts an electroabsorption spectrum 160 and a diffraction spectrum 170 characteristic of the heterostructure described here at an incident light intensity of 400 μW/cm$^2$ and an applied field of 4 kV/cm. The diffraction spectrum 170, which is described in greater detail below, indicates how the strength of the photorefractive effect varies with the wavelength used for recording (i.e., for creating the polarization pattern). It is evident from FIG. 4 that a suitable wavelength range for exploiting the electroabsorption of the heterostructure is from about 826 nm to about 829 nm in this particular structure, and a suitable wavelength range for exploiting the photorefraction of the heterostructure is from about 823 nm to about 832 nm. It should be noted that spectra 160 and 170 are difference spectra obtained effectively by substracting the spectrum taken in the absence of an applied field from that taken in the presence of the applied field. It should also be noted that the spectra as depicted are not normalized to the response curves of the measuring instruments, and therefore they are of only qualitative, rather than quantitative value. At higher applied fields, this wavelength range is larger.

In order to obtain spectrum 170, a diffraction grating was recorded in the heterostructure. That is, the heterostructure was placed in a conventional two-wave mixing arrangement in which two laser beams were made to intersect within the heterostructure with a half angle of ten degrees, resulting in a sinusoidal optical interference pattern having a period of 2.4 μm. Photocarriers excited in the bright portions of the interference pattern moved in the plane of the quantum wells (i.e., parallel to the layers of the heterostructure) to screen the applied field and were eventually trapped at the deep levels. The resulting trapped space charge created a spatially modulated internal electric field which in turn gave rise to both an electroabsorption grating and a photorefractive index grating by the QCSE. Because the heterostructure is thin relative to the period of the gratings, the recorded gratings behaved as Raman-Nath (thin) gratings and produced substantial diffraction into the $+1$ and $-1$ orders. The diffraction efficiency (i.e., the ratio of diffracted to incident light intensity) was measured using the first-order diffraction of one of the incident beams. It is that diffraction efficiency that is the source of spectrum 170 of FIG. 4. It should be noted that at wavelengths where the electroabsorption drops to zero, i.e., at about 825 nm and about 830 nm, all of the diffraction is due to the photorefractive index grating, and not to the electroabsorption grating.

EXAMPLE

A multilayer heterostructure of Al$_{0.3}$Ga$_{0.7}$As and GaAs was made as described above. A diffraction grating having a period of 2.4 μm was recorded in the heterostructure using two optical beams derived from a turnable, cw Ti-sapphire laser. The first-order diffraction of one of the incident beams was measured by phase-locked detection of the output from a silicon photodiode while modulating the applied field at a frequency of 170 Hz. The diffraction signal was observed at twice the modulation frequency because the excitonic electro-optic effects are insensitive to the sign of the applied field.

The maximum value of the steady state diffraction efficiency was found to be $10^{-5}$ with an incident optical intensity of 400 $\mu$W/cm$^2$ and an applied electric field of 4 kV/cm. The measured diffraction efficiency increased with applied electric field but was essentially constant as a function of incident intensity over the range of intensities studied, i.e., from about 0.1 to about 10 mW/cm$^2$. From measurements of the photoconductivity, the saturation intensity of the diffraction efficiency was calculated to be 0.1 $\mu$W/cm$^2$. At incident optical intensity of 400 $\mu$W/cm$^2$ and applied electric field of 4 kV/cm, the grating relaxation time is estimated to be 1.3 ms. At a diffraction efficiency of $4 \times 10^{-5}$, the recording sensitivity of the heterostructure was found to be 30 fJ/bit, where the bit area is taken to be the square of the grating period. This energy is about two orders of magnitude lower than non-resonant semi-insulating GaAs for an equivalent diffraction efficiency.

We claim:

1. Apparatus comprising:
    a photoconductive, photorefractive medium;
    means for illuminating the medium with spatially varying electromagnetic radiation; and
    means adapted for forming an applied electric field within the medium,
    characterized in that
    the medium comprises a semi-insulating, monolithic, multilayer heterostructure having at least four layers;
    the heterostructure has a lateral extent greater than its thickness; and
    the heterostructure has an areal distribution of deep levels, capable of localizing photocarriers, over essentially all of its lateral extent, such that when spatially varying electromagnetic radiation of a suitable wavelength is absorbed by the medium, photocarriers are localized by the deep levels, causing a spatially varying internal electric field and a spatially varying distribution of refractive index variations within the medium.

2. A method for making an apparatus, comprising the steps of:
    forming a photoconductive, photorefractive medium;
    creating in the medium imperfections capable of localizing charge carriers;
    providing means adapted for applying an electric field to the medium; and
    providing means adapted for exposing the medium to a spatially non-uniform pattern of illumination,
    characterized in that
    the forming step comprises forming a multilayer heterostructure having a lateral extent greater than its thickness; and
    the creating step comprises creating in the heterostructure, over essentially all of its lateral extent, an areal distribution of deep levels capable of localizing electric charge carriers.

3. Apparatus of claim 1, wherein the heterostructure comprises ion-implanted semiconductor material.

4. Apparatus of claim 1, wherein the heterostructure comprises doped semiconductor material.

5. Apparatus of claim 1, wherein the heterostructure comprises semiconductor material implanted with hydrogen ions or oxygen ions.

6. Apparatus of claim 1, wherein the heterostructure comprises III-V material or II-VI material.

7. Apparatus of claim 1, wherein the heterostructure comprises III-V material doped with iron or chromium.

8. Apparatus of claim 1, wherein the medium exhibits an excitonic optical absorption peak.

9. Apparatus of claim 1, wherein the heterostructure comprises a multiple quantum well structure.

10. Method of claim 2, wherein the creating step comprises ion implantation.

11. Method of claim 2, wherein the creating step comprises doping.

* * * * *